United States Patent [19]
Koester

[11] Patent Number: 5,805,387
[45] Date of Patent: Sep. 8, 1998

[54] MECHANISM TO DAMPEN VIBRATION OF A STOP PIN OF A DISC DRIVE ACTUATOR ARM

[75] Inventor: David D. Koester, Chanhassen, Minn.

[73] Assignee: Seagate Technology, Inc., Scotts Valley, Calif.

[21] Appl. No.: 826,278

[22] Filed: Mar. 27, 1997

[51] Int. Cl.[6] .................................................. G11B 5/55
[52] U.S. Cl. ............................................................ 360/106
[58] Field of Search .................... 360/105, 106, 360/107

[56] References Cited

U.S. PATENT DOCUMENTS

| | | | |
|---|---|---|---|
| 4,879,617 | 11/1989 | Sampietro et al. | 360/105 |
| 4,989,108 | 1/1991 | Chang | 360/105 |
| 5,227,936 | 7/1993 | Strickler et al. | 360/106 |
| 5,381,290 | 1/1995 | Cheng | 360/105 |
| 5,491,598 | 2/1996 | Stricklin et al. | 360/106 |

FOREIGN PATENT DOCUMENTS

| | | | |
|---|---|---|---|
| 0355692 | 2/1990 | European Pat. Off. | 360/106 |
| 2-193375 | 7/1990 | Japan | 360/105 |
| 9001767 | 2/1990 | WIPO | 360/106 |

*Primary Examiner*—Allen T. Cao
*Attorney, Agent, or Firm*—Kinney & Lange, P.A.

[57] ABSTRACT

An E-block has an actuator arm carrying a slider; the E-block being rotatable to position the slider over a selected track of a recording disc of a magnetic disc drive. The E-block has a stop pin arranged to engage a first stop when the slider is positioned adjacent an inner track on the disc and to engage a second stop when the slider is positioned adjacent an outer track on the disc. A damping mechanism is attached to the E-block and engages the stop pin to dampen vibration in the stop pin. In one embodiment, the damping mechanism includes a rigid arm mounted to the E-block and a resilient damper mounted to the arm and to the pin. In one form of this embodiment, the resilient damper includes an aperture, and the stop pin is supported within the aperture in interference fit to the damper.

9 Claims, 4 Drawing Sheets

MECHANISM TO DAMPEN VIBRATION OF A STOP PIN OF A DISC DRIVE ACTUATOR ARM

BACKGROUND OF THE INVENTION

This invention relates to improvements in actuator arm assemblies for magnetic disc drives, and particularly to a damping mechanism for the stop pin assembly of the actuator arm to dampen vibration in the actuator arm.

Actuator assemblies of disc drives employ an E-block rotatable on a shaft to rotate the actuator arms about the shaft. A slider, mounted to a gimbal spring, carries a transducer at the distal end of the actuator arm and is arranged to cooperate with the rotating disc to "fly" a small distance above the disc surface. More particularly, the gimbal biases the slider toward the disc surface while windage due to rotation of the disc reacts against an air bearing surface on the slider causing the slider to "fly" above the disc surface. The actuator arm is operated by an actuator motor, typically a voice coil motor, to rotate the actuator arm about the axis of the actuator shaft, thereby moving the slider in an arc generally radially across the concentric tracks of the disc surface. A stop mechanism is ordinarily employed with the E-block to limit the rotational movement of the E-block and actuator arms between an inner and an outer radial region over the disc surface.

Typically, the disc surface includes a landing or park zone on which the slider may be landed when the disc is not rotated. More particularly, a dedicated region of the disc surface, usually at an inner radial region, is dedicated to the landing of the slider due to the absence of windage when the disc is not rotated. This inner radial position is ordinarily defined by the stop mechanism associated with the E-block, which defines the innermost radial position of the actuator arm.

Likewise, it is important to provide a limit to the outer radial position of the actuator arm. More particularly, if the actuator arm were to move the slider past the outer periphery of the disc, windage created by the rotating disc surface would no longer support the slider, and the gimbal spring would bias the slider to a position below the plane of the disc surface and outside the periphery of the disc. If the voice coil motor then tries to move the actuator arm back to position the slider over the disc surface, the slider would engage the edge of the disc, causing damage to the slider, transducing head, gimbal and/or disc.

Some magnetic disc drives employ a stop mechanism for the E-block assembly that includes a stop pin mounted to the E-block to engage stops mounted to the disc drive housing. The stop mechanism limits the radial movement of the actuator arm. Due to space considerations and limitations within the disc drive housing, it is necessary that the stop pin be cantilevered from the E-block. During a track seek or track following procedure when the E-block is operated by the voice coil motor to position the actuator arm and slider to a selected position, movement of the E-block would induce a mechanical moment into the cantilevered pin, the release of which causes vibration in the E-block, and hence in the head. Additionally, when the stop pin engages the stop on the housing, a small amount of bending or deflection of the stop pin occurs, the release of which also causes vibration in the E-block and head. The vibration in the head position can increase the gain of the open loop servo. In terms of the servo operation of the disc drive to maintain head position, most disc drives are designed to operate so that open loop servo gain is less than about −6 decibels (dB) or when the phase margin is more than about 45°. Hence, when the open loop servo gain is greater than about −6 dB and less than about 45°, interference in the actuator arm operation can occur.

The present invention is directed to a mechanism for damping the stop pin, and particularly to a damping mechanism for assuring that the noise or vibration upon operation or contact of the stop mechanism is less than about −6 dB.

SUMMARY OF THE INVENTION

In one form of the invention, a damping mechanism dampens vibration in a stop pin of an E-block in a disc drive in which the stop pin is arranged to engage stops on the drive to limit rotation of the E-block. The damping mechanism comprises a rigid arm mounted to the E-block and a resilient damper mounted to the arm and to the pin. In one embodiment, The resilient damper includes an aperture, and the stop pin is supported within the aperture in interference fit to the damper.

In another form of the present invention, an E-block has an actuator arm carrying a slider; the E-block being rotatable to position the slider over a selected track of a recording disc of a magnetic disc drive. The E-block has a stop pin arranged to engage a first stop when the slider is positioned adjacent an inner track on the disc and to engage a second stop when the slider is positioned adjacent an outer track on the disc. A damping mechanism is attached to the E-block and engages the stop pin to dampen vibration in the stop pin. In one embodiment, the damping mechanism includes a rigid arm mounted to the E-block and a resilient damper mounted to the arm and to the pin. In one form of this embodiment, the resilient damper includes an aperture, and the stop pin is supported within the aperture in interference fit to the damper.

In a third form of the invention, a disc drive has a housing having first and second stops. At least one recording disc is supported on the housing for rotation about a disc axis. The disc has a surface containing a plurality of concentric tracks on which data may be recorded and from which data may be read, one of the tracks being an inner track at an inner radius and another of the tracks being an outer track at an outer radius. An actuator assembly is supported by the housing and includes an E-block having a body and at least one actuator arm extending from the body. A motor is operable for rotating the E-block about the actuator axis. A slider is mounted to a distal end of the actuator arm to fly adjacent the rotating disc between the inner and outer tracks on the disc. A stop pin is mounted to the E-block and is arranged to engage the first stop when the slider is positioned adjacent the inner track on the disc and to engage the second stop when the slider is positioned adjacent the outer track on the disc. The stop pin and stops cooperate to limit the rotational travel of the E-block. A damping mechanism is attached to the E-block and engages the stop pin to dampen vibration in the stop pin. In one embodiment, the damping mechanism includes a rigid arm mounted to the E-block and a resilient damper mounted to the arm and to the pin. In one form of this embodiment, the resilient damper includes an aperture, and the stop pin is supported within the aperture in interference fit to the damper.

DETAILED DESCRIPTION OF THE PREFERRED EMBODIMENTS

Figure 1:
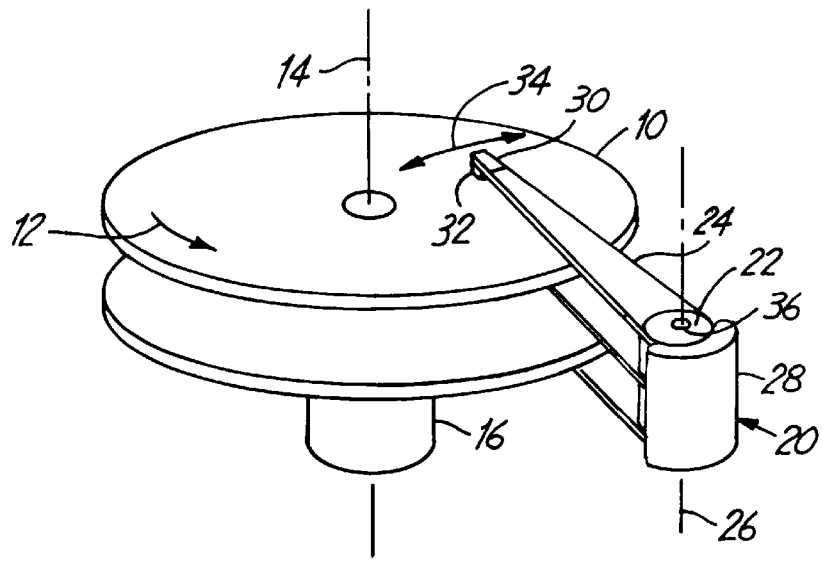
FIG. 1 is a perspective view of a magnetic disc drive.

FIG. 1 is a perspective view of a magnetic disc drive illustrating the principal operating parts thereof. One or more discs 10 are rotated in the direction of arrow 12 about axis 14 by spindle motor 16. Each disc 10 is a magnetic recording disc containing a plurality of concentric tracks on each side of the disc on which data are recorded or are to be recorded. An actuator assembly 20 comprises an E-block 22 having a body and a plurality of actuator arms 24 extending from the body. Actuator motor 28, such as a voice coil motor, is operated to rotate E-block 22 about axis 26. Each actuator arm 24 has, at its distal end, a gimbal 30 supporting a slider 32 which supports a transducer head adjacent a selected track. Slider 32 is aerodynamically configured so that windage due to rotation of disc 10 causes slider 32 to "fly" a short distance above the surface of the disc. The transducing head reads and/or writes data to the track on disc 10 confronting the transducing head. Where a plurality of discs are employed in a stack, as shown in FIG. 1, those actuator arms positioned between discs of the stack of discs ordinarily carry two gimbals 30, each having a slider 32 arranged to "fly" adjacent the respective surface of the disc above and below the actuator arm. Rotation of E-block 22 about axis 26 causes slider 32 to move along an arcuate path shown by arrow 34 between predetermined inner and outer track on the disc. A stop mechanism, not shown in FIG. 1, is employed in the actuator assembly 20 to limit the travel of slider 32 at the inner and outer tracks of disc 10.

Figure 2:
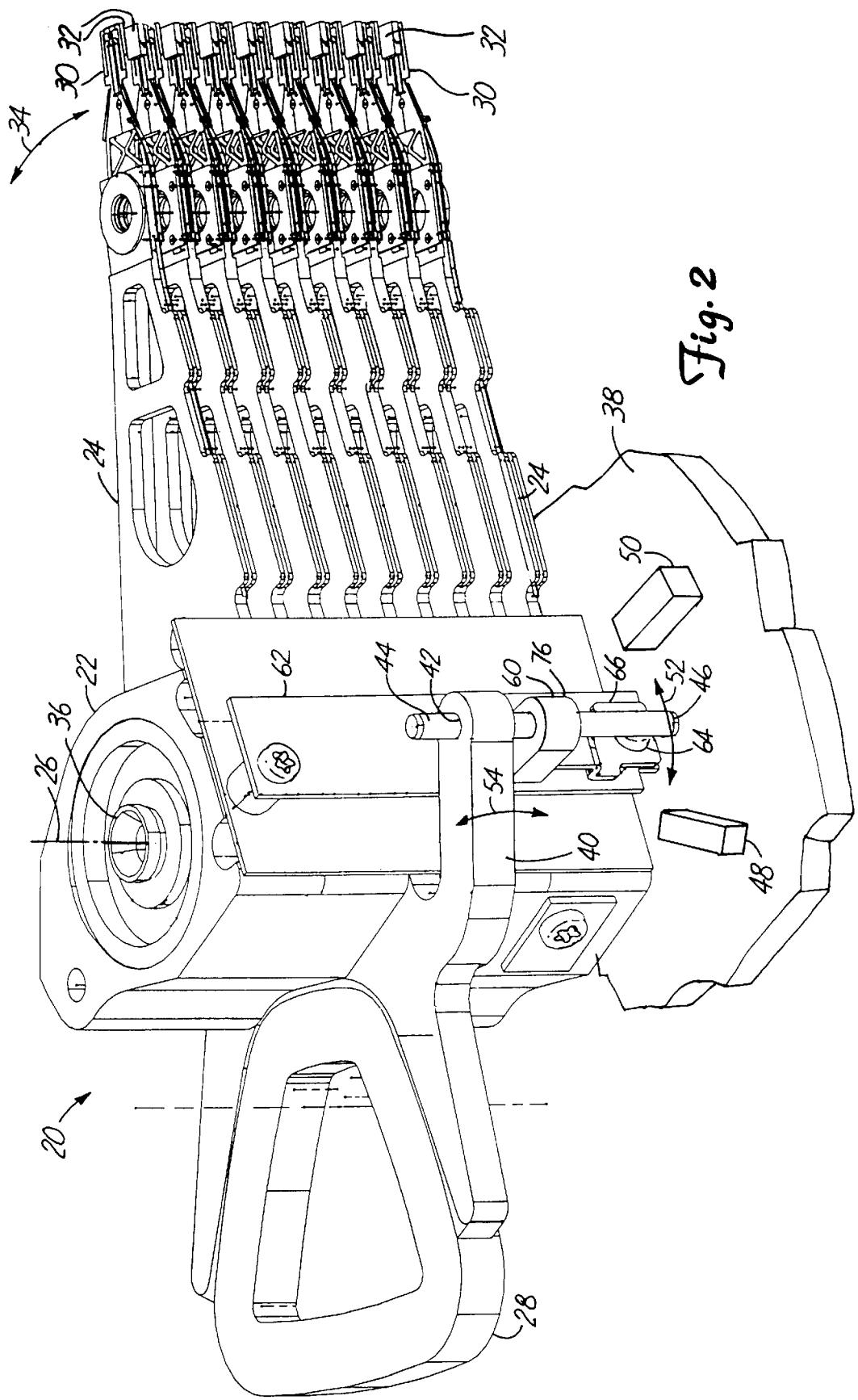
FIG. 2 is an enlarged perspective view of an actuator arm and a portion of the housing showing the stop pin damping mechanism according to the present invention.

FIG. 2 is an enlarged, detailed perspective view of actuator 20 shown in FIG. 1. An actuator arm shaft 36 is mounted to the disc drive housing 38 with E-block 22 journaled to shaft 36 to rotate about axis 26. E-block 22 includes a cantilevered arm 40 having an aperture 42 in which steel pin 44 is mounted by interference fit. Pin 44 is approximately 0.70 inches (1.8 cm) in length and has a diameter of approximately 0.062 inches (1.6 mm). The pin extends approximately 0.60 inches (1.55 cm) from arm 40 to the free end 46 of the pin. It will be appreciated that the size of pin 44 is given by way of example and not of limitation and that other sizes for stop pin 44 will be within the scope of this invention. Free end 46 of pin 44 is arranged to engage one or the other of stops 48 and 50 integral with housing 38 as pin 46 moves in the arcuate path shown by arrow 52 as E-block 22 rotates about axis 26. Stops 48 and 50 are positioned on housing 38 to define the limit of rotation of E-block 22 about axis 26; hence, the stops limit of movement of slider 32 along arc 34 over the surface of disc 10 (FIG. 1), thereby defining the innermost and outermost tracks on the disc.

One problem with the apparatus thus far described is that operation of the voice coil motor to move the E-block generates a momentum in the cantilevered which is translated back to the E-block to induce vibration in the E-block and the slider. More particularly, when E-block 22 rotates, stop pin 44 also rotates with the E-block. Upon a change in motion in the E-block, such as when the voice coil motor stops or reverses the direction of movement of the E-block, momentum of the end 46 of pin 44 causes pin 44 to bend or deflect slightly. The force associated with this momentum translates to arm 40 causing it to vibrate along arc 54. This vibration affects the servo tracking and positioning of the slider with respect to the disc surface. Vibration can also be induced in pin 44 when the pin strikes a stop 48 or 50. Measurements of the deflection indicate distortion of pin 44 as much as 0.03 inches (0.76 mm) at end 46.

Figure 3:
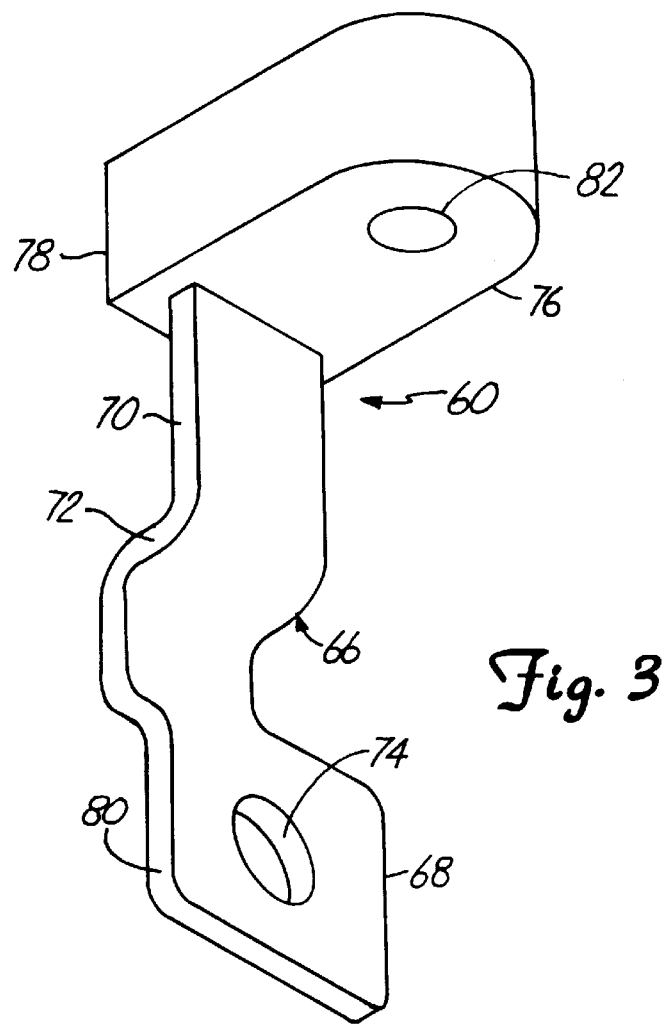
FIG. 3 is a perspective view of a damping mechanism for the actuator arm shown in FIG. 2.

To overcome the effects of the vibration of pin 44 striking stop 48 or 50, the novel damping mechanism 60, shown in greater detail in FIG. 3, is fastened to a side plate 62 of E-block 22 by fastener 64. Damping mechanism 60 includes a rigid arm 66, preferably constructed of stainless steel with a thickness of approximately 0.020 inches (0.52 mm). Arm 66 has a head portion 68, an arm portion 70 and a transition portion 72 forming a transition between head 68 and arm portion 70. Head 68 includes an aperture 74 through which fastener 64 (FIG. 2) fastens arm 66 to plate 62 (FIG. 2) of the E-block. The free end of arm portion 70 is molded into resilient damper 76, which is constructed of a suitable rubber, such as Flourel FE5621Q available from Minnesota Mining and Manufacturing Company of St. Paul, Minn., U.S.A. Damper 76 has a bottom surface 78 coplanar with a bottom surface 80 of head 68 of arm 66 so that when head 68 of arm 66 is fastened to plate 62 of the E-block (see FIG. 3), surface 78 of damper 76 also engages plate 62. Aperture 82 is formed within damper 76 and preferably has a diameter smaller than that of pin 44. Conveniently, aperture 82 has a diameter of approximately 0.050 inches so as to engage pin 44 in an interference fit. As shown particularly in FIG. 2, damper 76 engages pin 44 at its approximate midpoint. Hence, vibration in pin 44 is at least in part absorbed by damper 76. As a result, vibration in the E-block or in the slider caused by the stop pin is minimized.

Figures 4, 5:
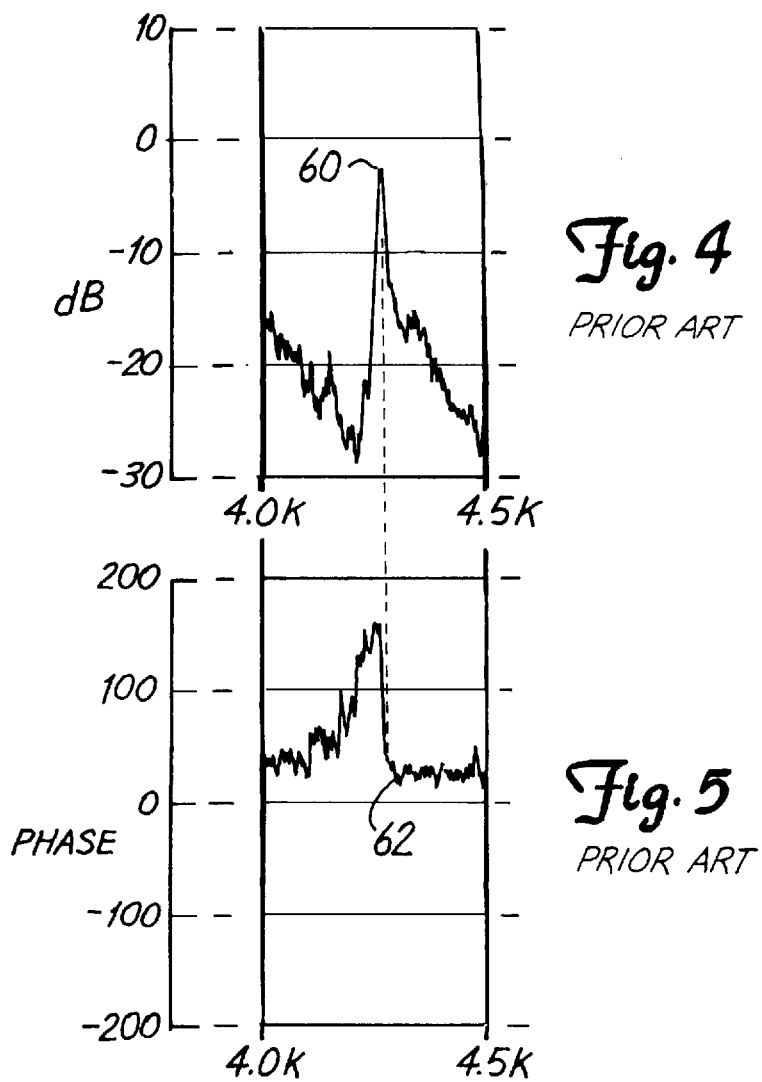
FIGS. 4 and 5 are waveforms illustrating the noise amplitude and phase margin, respectively, associated with the stop pin of the prior art.

FIGS. 4 and 5 are servo open loop Bode plots showing the noise and phase margin verses frequency for the servo mechanism operating motor 28 for the E-block. More particularly, the plots shown in FIGS. 4 and 5 illustrate the effects of vibration during a seek mode in a pin 44 not having the damping mechanism 60 according to the present invention. A change in velocity of the E-block causes vibration in stop pin 44, causing the noise amplitude to peak at 60 reaching as high as approximately −3 dB. At the same time that the noise raises to the −3 dB peak 60, the phase margin drops from approximately 160° to approximately 30°, as shown at 62 in FIG. 5. It is well known in the art that servo stability is assured when the phase margin is greater than about 45° or the noise is below about −6 dB. However, when the phase margin drops to below about 45° at the same time that the noise rises to above approximately −6 dB, the servo mechanism may become unstable, which in a worst case could cause vibration in the slider and lead to head crashes and other undesirable effects. Hence, without the damping mechanism of the present invention, a risk exists that undesirable effects will occur due to vibration in stop pin 44 upon changes in velocity in the E-block.

Figure 6:
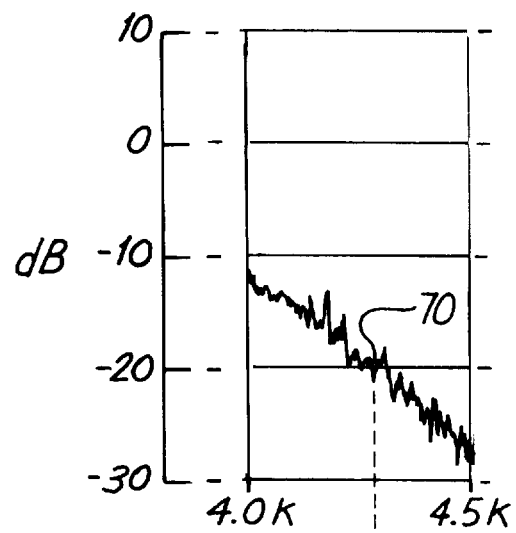
FIGS. 6 and 7 are waveforms illustrating the noise amplitude and phase margin, respectively, for the stop pin having a damping mechanism in accordance with the present invention.
Figure 7:
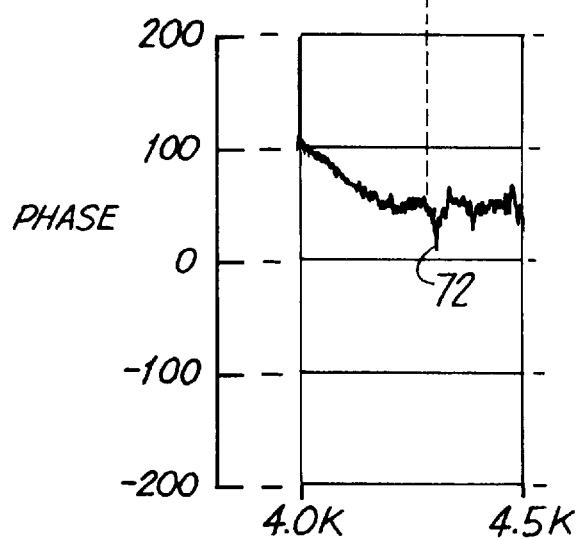

FIGS. 6 and 7 are also servo open loop Bode plots, as in FIGS. 4 and 5, showing the effect of damping mechanism 60 on the noise and phase margin caused by vibration during a seek operation. Damping mechanism 60 reduces the effects of vibration of the stop pin in the E-block by reducing the noise amplitude caused by the vibration. As shown at point 72 in FIG. 7, the phase margin may approach the lower limit of 45°, but the noise amplitude shown at point 70 in FIG. 6 remains significantly low, typically below about −20 dB, well below the −6 dB margin. Therefore, the damping mechanism of the present invention dampens the amplitude of the noise to prevent the noise from reaching an amplitude greater than about −6 dB.

Although the present invention has been described with reference to preferred embodiments, workers skilled in the art will recognize that changes may be made in form and detail without departing from the spirit and scope of the invention.

What is claimed is:

1. An E-block for a magnetic disc drive, the E-block having an actuator arm carrying a slider, the E-block being rotatable in the magnetic disc drive to position the slider over a selected track of a recording disc of the magnetic disc drive, the E-block having a stop pin mounted thereto, characterized by a damping mechanism mounted to the E-block, the stop pin being attached to and in engagement with the damping mechanism so that the damping mechanism dampens vibration in the stop pin.

2. The E-block of claim 1, wherein the damping mechanism comprises a rigid arm mounted to the E-block and a resilient damper mounted to the arm and to the stop pin.

3. The E-block of claim 2, wherein the resilient damper includes an aperture, and the stop pin is supported within the aperture in interference fit to the damper.

4. A disc drive comprising:

a housing;

at least one recording disc supported on the housing for rotation about a disc axis, the disc having a surface containing a plurality of concentric tracks; and an actuator assembly supported by the housing, the actuator assembly comprising:

an E-block having a body and at least one actuator arm extending from the body, the body being rotatable about a actuator axis, a slider mounted to a distal end of the actuator arm to fly adjacent the rotating disc, a motor for rotating the E-block about the actuator axis to move the slider between inner and outer tracks, a stop pin mounted to the E-block, and a damping mechanism mounted to the E-block, the stop pin being attached to and in engagement with the damping mechanism so that the damping mechanism dampens vibration in the stop pin.

5. The disc drive of claim 4, wherein the damping mechanism comprises a rigid arm mounted to the E-block and a resilient damper mounted to the arm and the stop pin.

6. The disc drive of claim 5, wherein the resilient damper includes an aperture, and the stop pin is supported within the aperture in interference fit to the damper.

7. The disc drive of claim 4, wherein the inner track is at an inner radius of the disc and the outer track is at an outer radius of the track, a first stop supported by the housing and arranged to engage the stop pin when the slider is positioned adjacent the inner track, and a second stop supported by the housing and arranged to engage the stop pin when the slider is positioned adjacent the outer track, the stop pin and stops thereby cooperating to limiting the rotational travel of the E-block.

8. The disc drive of claim 7, wherein the damping mechanism comprises a rigid arm mounted to the E-block and a resilient damper mounted to the arm and to the stop pin.

9. The disc drive of claim 8, wherein the resilient damper includes an aperture, and the stop pin is supported within the aperture in interference fit to the damper.

* * * * *

UNITED STATES PATENT AND TRADEMARK OFFICE
CERTIFICATE OF CORRECTION

PATENT NO. : 5,805,387
DATED : SEPTEMBER 8, 1998
INVENTOR(S) : DAVID D. KOESTER

It is certified that error appears in the above-identified patent and that said Letters Patent is hereby corrected as shown below:

Col. 6, line 13, delete "and the stop pin", insert --and to the stop pin--

Signed and Sealed this

Twenty-first Day of September, 1999

Attest:

Q. TODD DICKINSON

*Attesting Officer*     Acting Commissioner of Patents and Trademarks